April 8, 1969     T. L. SULZBACH     3,437,707
PROCESS FOR AROMATIC ALKYLATION AND OLEFINIC OLIGOMERIZATION
Filed Sept. 12, 1967
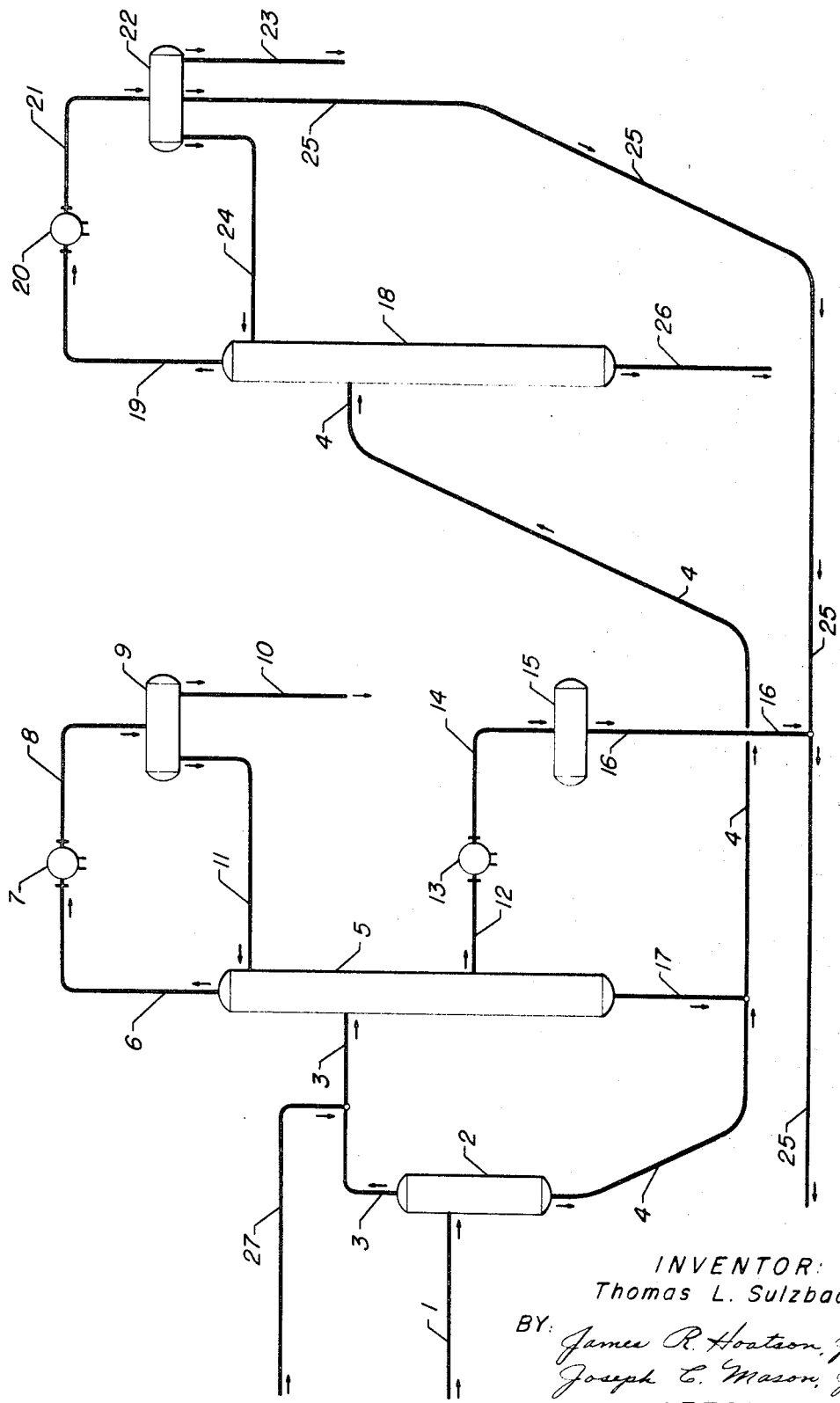
INVENTOR:
Thomas L. Sulzbach
BY: James R. Hoatson, Jr.
Joseph C. Mason, Jr.
ATTORNEYS

United States Patent Office 3,437,707
Patented Apr. 8, 1969

3,437,707
PROCESS FOR AROMATIC ALKYLATION AND OLEFINIC OLIGOMERIZATION
Thomas L. Sulzbach, Elk Grove Village, Ill., assignor to Universal Oil Products Company, Des Plaines, Ill., a corporation of Delaware
Filed Sept. 12, 1967, Ser. No. 667,122
Int. Cl. C07c 3/50, 7/04
U.S. Cl. 260—671                                         10 Claims

ABSTRACT OF THE DISCLOSURE

Separation process for a reaction zone effluent containing at least three components, such as an aromatic alkylation reaction zone effluent. In the separation of an aromatic alkylation zone effluent, at least a part of the reaction effluent is fractionated to provide unreactive diluent, a side-cut fraction comprising alkylatable aromatic compound, and a bottoms fraction comprising alkylatable aromatic compound and alkylated aromatic compound. The bottoms fraction is separated to provide a first fraction comprising alkylatable aromatic compound and a second fraction comprising alkylated aromatic compound. The side-cut fraction and at least a part of the first fraction are returned to the reaction zone. The process is equally effective in the separation of the effluent from an oligomerization reaction zone wherein at least a portion of partially-oligomerized product is returned to the oligomerization zone. Specific application of the process is in the synthesis of ethylbenzene, cumene, heptene, and propylene-trimer.

Field of invention

The present invention relates to a separation process for recovery of product from a reaction zone effluent containing at least three components. The present invention particularly relates to the separation of the effluent from an alkylation reaction zone to provide a reactant stream for return to the reaction zone, and a product stream of alkylated aromatic compound. The inventive process also relates to the separation of the effluent from an oligomerization reaction zone to provide a stream of partially-oligomerized product for return to the reaction zone, and a product stream of oligomerized product. Most particularly, the present invention relates to a method of separation which results in an improved process for alkylation of benzene with a propylene-propane mixture, for the alkylation of benzene with an ethylene-ethane mixture, for the oligomerization of propylene in a propylene-propane mixture, and for the co-oligomerization of propylene and butene in a reactive mixture containing propane and butane.

The present invention finds one broad application in the production of alkylated aromatic hydrocarbons for use in subsequent chemical synthesis. The present invention particularly finds application in the production of isopropyl-benzene, or cumene, which is utilized in the synthesis of phenol, acetone, alpha-methylstyrene, and acetophenone. These cumene-derived chemicals are intermediates in the synthesis of resins for plastics and nylon. A further application of the inventive process is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, polystyrene and other plastics, as well as in the synthesis of styrene-butadiene rubber and in the formulation of coatings including latex paints.

Application of the inventive process may also be found in the alkylation of substituted aromatics such as phenol, which when alkylated with isobutylenes forms O-tertiarybutylphenol which is an intermediate in the synthesis of other chemicals, and forms p-tertiarybutylphenol which is used to modify phenolformaldehyde resins. A further application of the inventive process upon substituted aromatic hydrocarbons may be found in the alkylation of parahydroxyanisole with tertiary butyl alcohol or isobutylene to form butylated hydroxyanisole which finds utility as an antioxidant in the preservation of foods.

The present invention finds additional application in the oligomerization of olefin-acting compounds. Oligomerization of propylene may be undertaken to produce commercial fractions of propylene-trimer and propylene-tetramer, within the scope of the inventive process. Trimer finds utility in the synthesis of nonyl-phenol detergents and in the synthesis of decyl alcohols by the Oxo Process. Tetramer is also used in the synthesis of detergents. The inventive process also finds application in the synthesis of commercial fractions of heptene which are produced by the co-oligomerization of propylene and butenes in a reaction mixture comprising propylene, propane, butene, and butane. Heptene is utilized in the synthesis of octyl alcohols by the Oxo Process. (It is to be noted that oligomerization of olefin hydrocarbons is more commonly referred to as "polymerization of olefins" in the petroleum refining industry.)

Description of the prior art

As indicated above, the present invention particularly relates to the recovery of isopropylbenzene, or cumene, from an alkylation reaction effluent.

In the commercial manufacture of cumene it is the art to charge benzene and propylene into a reactor containing a solid phosphoric acid catalyst.

Because it is desired to minimize the dialkylation of benzene which produces di-isopropylbenzene by-product, it is the art to have a molar deficiency of propylene in the reaction zone and normally this deficiency is provided by maintaining the ratio of benzene to propylene at about 8:1. The resulting alkylation effluent which leaves the reaction zone will therefore contain about seven moles of unreacted benzene per mole of product cumene, and the excess benzene must be separated from the effluent and recycled to the reaction zone in conjunction with the fresh benzene feed which is charged to the process.

The propylene reactant which is typically charged to the process will contain unreactive diluent comprising propane with traces of ethane and butane. When the propylene feed is derived from a pyrolysis plant these diluents will normally be less than 10 mole percent, while a propylene feed derived from the gas recovery unit of a fluid catalytic cracking plant will often contain as much as 35 to 40 mole percent of unreactive diluents. In addition to the unreactive propane diluent which is inherent in the propylene feed, it is typically the art to introduce additional propane diluent into the reaction zone to provide a thermal quench for the exothermic alkylation reaction in order that the catalyst temperature may be controlled at the desired level. This propane quench may be introduced into the reactor at elevated temperature with the propylene-propane fresh feed, or it may be introduced at elevated temperature or at ambient temperature into the reaction zone at several intermediate quench points between several catalyst beds. The alkylation effluent which leaves the typical reaction zone therefor contains a considerable amount of propane diluent. This diluent must be separated from the effluent in order that a portion may be recycled to the reaction zone and in order that a quantity may be withdrawn from the process.

The quantity withdrawn is equivalent to the quantity which is being introduced into the process in the propylene-propane feed, and it must be withdrawn from the process in order to avoid accumulation of unreactive diluents in the process unit.

It is the art in the manufacture of cumene to charge the alkylation effluent to a fractionation train comprising a depropanizer column, a benzene column, and a cumene column. The effluent enters the depropanizer wherein the propane diluent is removed overhead to provide the propane recycle stream for return to the reaction zone and a net propane product stream which is normally withdrawn to the fuel gas system or sent to product storage as liquefied petroleum gas (LPG). The bottoms liquid from the depropanizer passes into the benzene column which produces a benzene overhead stream. Part of the benzene produced provides the required recycle to the reaction zone and a second part is withdrawn from the process in order to avoid the accumulation of non-aromatic contaminants which enter the process as trace constituents in the benzene feed. The benzene column bottoms passes to a cumene column which produces an overhead comprising high purity cumene product and a bottoms by-product comprising polyalkylated benzene.

The inventive separation process is equally applicable in the oligomerization of an olefin-acting compound in the presence of an unreactive diluent wherein a desired oligomerized product is produced and partially-oligomerized product must be separated therefrom. For example, in the production of propylene-tetramer a typical propylene-propane feed is oligomerized over a solid phosphoric acid catalyst to produce a reactor effluent usually comprising propane, propylene-dimer, propylene-trimer, propylene-tetramer, and propylene-pentamer. It is therefore necessary to depropanize the reactor effluent in order to provide a recycle diluent propane stream for catalyst temperature control, and to recycle the propylene-dimer and propylene-trimer to the reaction zone for further oligomerization with propylene to produce additional product propylene-tetramer. It is well known to those skilled in the art, that the required separation of the reactor effluent is accomplished by passing the effluent into a series of fractionating columns comprising a depropanizer column, a column for obtaining the desired recycle fraction of partially-oligomerized product, and a column for recovery of the desired oligomerized product.

The inventive process is similarly applicable to the separation of the reactor effluent resulting from the synthesis of heptene by co-oligomerization of propylene and butenes. The unreactive diluent which must be recycled to the reactor for temperature control normally comprises a mixture of propane and butane. Because the olefinic feed contains propylene, butenes, and possible traces of other olefins, the reactor effluent will contain hexenes, heptenes, octenes, and heavier oligomerization products. It is the art to recover heptenes and octenes as the product fraction and to recycle hexenes and lighter olefins for additional oligomerization. It is well known to those skilled in the art that this separation of the oligomerization reactor effluent is accomplished in a series of fractionating columns which are operated in a conventional manner.

*Summary of the invention*

It is an object of the present invention to provide a method for the separation of a process stream containing at least three components. It is a further object of the present invention to provide a process for the separation of a reaction zone effluent. It is a particular object of the present invention to provide a separation process for the recovery of alkylated aromatic compounds from the effluent of an alkylation reaction zone and for the recovery of oligomerized products from the effluent of an oligomerization reaction zone. It is a specific object of this invention to produce ethylbenzene, cumene, heptene, propylene-trimer, and propylene-tetramer in a more economical and facile manner.

These and other objectives will be readily ascertained from the following description and the attached drawing which is a simplified flow diagram setting forth one specific embodiment of the invention.

In accordance with these objectives, a broad embodiment of this invention may be characterized as a process for separating a reaction zone effluent containing at least three components which comprises: passing at least a part of the effluent from a reaction zone into a fractionation column maintained under separation conditions; withdrawing from the fractionation column a first fraction comprising a first component, a second fraction comprising a second component, and a third fraction comprising second component and a third component; passing the third fraction into a separation zone maintained under separation conditions; withdrawing from the separation zone a fourth fraction comprising second component and a fifth fraction comprising the third component in high concentration; passing the second fraction into the reaction zone; and, recovering the fifth fraction.

A particular embodiment of the present invention may be characterized by this separation process wherein the reaction zone comprises an alkylation reaction zone, the first component comprises an unreactive diluent, the second component comprises an alkylatable aromatic compound, and the third component comprises an alkylated aromatic compound.

A further particular embodiment of the present invention may be characterized by this separation process wherein the reaction zone comprises an oligomerization reaction zone, the first component comprises an unreactive diluent, the second component comprises partially-oligomerized product, and the third component comprises oligomerized product.

In a more specific embodiment of the inventive process as defined in the three broad embodiments above, at least a part of the first fraction and at least a part of the fourth fraction are passed into the reaction zone.

Many aromatic compounds are utilizable as alkylatable aromatic compounds within the process of this invention. The preferred aromatic compounds are aromatic hydrocarbons, including monocyclic aromatics, polycyclic aromatics, and alkylaromatics, but substituted aromatic hydrocarbons are equally suitable. Such aromatic compounds as phenol, cresol and hydroxyanisole are among the substituted aromatic hydrocarbons which may be alkylated to produce an effluent for separation within the scope of the inventive process.

Of the alkylatable aromatic compounds suitable for use within the process of this invention the monocyclic aromatic hydrocarbons are preferred and benzene is particularly preferred.

The olefin-acting compound or alkylating agent which may be processed within a reaction zone to yield an effluent suitable for separation within the embodiments of the inventive process, may be selected from diverse materials including mono-olefins, diolefins, polyolefins, acetylenic hydrocarbons, alcohols, ethers and esters. Among the esters which are utilizable are alkylhalides, alkylsulfates, alkylphosphates, and various esters of carboxylic acids.

The preferred olefin-acting compounds are olefinic hydrocarbons and particularly preferred are the mono-olefins. Mono-olefins which are utilized as olefin-acting compounds in the process of the present invention may be either normally gaseous or normally liquid at ambient temperature and include ethylene, propylene, 1-butenes, 2-butenes, isobutylene, and higher molecular weight normally liquid olefins.

Also included within the scope of the olefin-acting alkylating agent or olefin-acting compound are certain substances capable of producing olefinic hydrocarbons or intermediates thereof under the conditions of operation utilized within an alkylation reaction zone or an oligomerization reaction zone. Typical olefin producing substances or olefin-acting compounds capable of use include alkylhalides capable of undergoing dehydrohalogenation to form olefinic hydrocarbons, and alcohols capable of undergoing dehydration to produce olefinic hydrocarbons.

The alkylation of the alkylatable aromatic compound with the olefin-acting compound or alkylating agent will normally be undertaken in the reaction zone in the presence of an alkylation catalyst under suitable operating conditions. The operating conditions of temperature, pressure and reaction time will vary depending upon the composition of the catalyst and the type of olefin-acting compound and alkylatable aromatic compound being processed. Typical operating conditions are well known to those skilled in the art and need not be set forth herein. The acid-acting catalyst may be selected from various materials such as sulfuric acid, phosphoric acid, hydrogen fluoride, aluminum chloride, aluminum bromide, boron trifluoride, ferric chloride, zinc chloride, zirconium chloride, various synthetically prepared cracking catalysts, such as silica-alumina, silica-alumina-zirconia, silica-magnesia, and various acid-acting clays including activated alumina. A particularly preferred catalyst which is utilized for the alkylation of aromatics within the practice of this invention is solid phosphoric acid catalyst which is a calcined composite of phosphoric acid and a siliceous absorbent. Another preferred catalyst utilized for alkylation of aromatics within the inventive process comprises a complex of boron trifluoride with alumina. A further preferred catalyst comprises a composite of silica-alumina.

The oligomerization of olefin-acting compounds is also undertaken in the reaction zone in the presence of an acid-acting catalyst. Suitable operating conditions of temperature, pressure, and residence time will vary depending upon the specific catalyst being used and the type of olefin-acting compound being reacted. Typical operating conditions are well known to those skilled in the art and need not be set forth herein. The acidic catalysts which have been defined hereinabove for the alkylation of aromatic compounds with olefin-acting compounds are equally effective for the oligomerization of olefin-acting compounds. A particularly preferred catalyst which is utilized for the oligomerization of olefin-acting compounds within the practice of this invention is solid phosphoric acid catalyst which is a calcined composite of phosphoric acid and a siliceous absorbent.

An understanding of the present invention may now be readily obtained by referring to the accompanying drawing which sets forth a simplified flow for carrying out one specific example wherein the process of the present invention is practiced.

*Drawing and example*

As previously noted, the particularly preferred embodiment of this invention comprises the inventive process wherein the alkylatable aromatic compound is benzene, the olefin-acting alkylating agent is propylene, the unreactive diluent is propane and the desired mono-alkylated aromatic compound is high purity cumene. Referring now to the drawing, benzene, propylene, and propane enter an aromatic alkylation reaction zone, not shown, and the resulting effluent containing propane, benzene, cumene, and heavier alkylbenzene enters the inventive process via line 1 at the late of 7561.8 moles per hour at a pressure of 500 p.s.i.g. and at a temperature of 440° F. The effluent passes into a flash zone 2 maintained at 390° F. and 250 p.s.i.g. The effluent is separated therein into liquid and vapor phases. The vapor phase comprising propane, benzene, and a slight amount of cumene leaves flash zone 2 via line 3 at a pressure of 245 p.s.i.g. and a temperature of 390° F. The flash liquid comprising benzene, cumene, and heavier alkylbenzene leaves flash zone 2 at 390° F. at a rate of 4051.1 moles per hour and passes via line 4 to fractionation as will be disclosed hereinafter.

The flash vapor in line 3 is passed to a heat exchanger, not shown, wherein it is cooled to 325° F. This cooled stream passes via line 3 at the rate of 4322.9 moles per hour and is augmented by a fresh benzene feed which enters line 3 via line 27 at 270° F. and at a rate of 812.2 moles per hour from a source not shown. This combined flash vapor stream and fresh benzene stream continues in line 3 and enters the depropanizer column 5 at 235 p.s.i.g. and 322° F. The depropanizer column produces a net overhead vapor which leaves via line 6 at the rate of 3193.4 moles per hour at 230 p.s.i.g. and 120° F. This propane vapor stream enters condenser 7 wherein it is condensed and cooled to 100° F. before passing into separator 9 via line 8. The liquid propane in separator 9 is divided into two parts, one part passing via line 11 as propane reflux back to column 5 at the rate of 2338.0 moles per hour. A net propane product stream leaves separator 9 via line 10 at the rate of 855.4 moles per hour. This propane stream is sent in part to fuel gas or to LPG storage, while a second part of this stream is typically returned to the reaction zone to provide a means of catalyst temperature control.

A vapor sidecut stream comprising benzene leaves depropanizer column 5 via line 12 at the rate of 3066.8 moles per hour, at a pressure of 235 p.s.i.g. and at a temperature of 410° F. This vapor stream enters condenser 13 wherein the benzene is condensed to the liquid phase and cooled to 390° F. before passing into separator 15 via line 14. This hot liquid benzene is removed from separator 15 via line 16 by a pump, not shown, which transfers the hot liquid at a pressure of 640 p.s.i.g. via line 16 as a part of the benzene recycled to the reaction zone as will be noted hereinafter.

A net liquid depropanizer bottoms stream comprising benzene and cumene leaves depropanizer 5 via line 17 at a rate of 400.7 moles per hour and at a temperature of 470° F. This depropanizer bottoms stream is then introduced into line 4 wherein it is combined with the flash liquid stream from flash zone 2 which is at 390° F. The resulting total hot liquid stream is then introduced via line 4 at a rate of 4451.8 moles per hour into a benzene column 18 at a pressure of 20 p.s.i.g. and a temperature of 307° F.

Benzene column 18 provides a benzene fraction and a cumene-rich fraction by standard fractionating practice. Benzene overhead vapor leaves column 18 via line 19 at 230° F. and 15 p.s.i.g. This vapor stream enters condensor 20 at the rate of 6860.9 moles per hour wherein it is condensed and cooled to 100° F. before passing via line 21 into separator 22. The benzene liquid is withdrawn from separator 22 in three parts. A first potrion passes via line 24 to column 18 as reflux at the rate of 3190.0 moles per hour while a second portion passes via line 23 to storage or to further processing as a benzene net product stream. This second portion contains non-aromatic contaminants which enter the aromatic alkylation process with the fresh benzene or propylene-propane feed and must be removed from the process in order to avoid accumulation of unreactive heavy liquids within the process unit. This stream is removed via line 23 at a rate of 33.0 moles per hour.

A third portion of the benzene liquid leaves separator 22 via line 25 at a rate of 3637.9 moles per hour for return to the reaction zone. This benzene recycle which is at a temperature of 100° F. is combined with the hot benzene recycle which enters line 25 from line 16 at 390° F. The total benzene recycle of 6704.7 moles per hour then passes to the alkylation reaction zone at 640 p.s.i.g. and 245° F.

A net bottoms stream leaves the benzene column 18 via line 26 at 20 p.s.i.g. and 375° F. This bottoms stream, amounting to 780.9 moles per hour, passes to a cumene fractionator, not shown, wherein it is separated to provide a high purity cumene product at the rate of 744.4 moles per hour and a cumene bottoms fraction comprising heavy alkylbenzene at a rate of 36.5 moles per hour.

Several important advantages of the inventive process may be readily ascertained from the foregoing example and process description.

First, there are economic savings to be realized at the benzene column. It will be seen that about half of the benzene recycle is returned to the alkylation reactor as a hot sidecut from the depropanizer column. This results in a reduced loading at the benzene column for not only is the feed input reduced but the amount of reflux is reduced accordingly. Thus, the column diameter, overhead condensing system, reboiler system, and other auxiliary equipment may be significantly reduced the to the reduced column loading. Not only is capital cost reduced for this equipment, but utilities expenses for operating the benzene column is also reduced.

There is an additional savings in utility expenses derived from the manner by which the recycle benzene is processed in the inventive process. The recycle benzene which is returned to the reaction zone must be heated to reaction temperature. It will be noted that about half of the benzene recycle is returned as a hot liquid sidecut from the depropanizer. Since this portion of the benzene recycle is not cooled to 100° F. as in the prior art processing methods, a considerable savings in preheating expense results at the alkylation reaction zone.

Similarly, it will be seen that in order to return the recycle benzene to the reaction zone, the recycle benzene stream must be pumped up to reaction zone pressure. In the inventive process, the hot benzene side-cut which is withdrawn from the depropanizer is already at a substantially elevated pressure, thus providing a substantial saving in power requirements and operating expense over the prior art processes where all of the recycle benzene must be pumped from the low pressure benzene column.

Other advantages in addition to those set forth hereinabove will be apparent to those skilled in the art.

While the embodiment set forth has been specific to the manufacture of cumene by the inventive process, it must be realized that the present invention is also applicable to the manufacture of other alkylated aromatic hydrocarbons such as ethylbenzene. The inventive process may also be found to be effective in the separation of the effluent from the synthesis of other alkylated aromatic compounds, such as alkylphenols or butylated hydroxyanisole.

It will be readily seen that the inventive separation process as set forth in the drawing and example above, is equally applicable to the separation of an effluent from an oligomerization reactor as, for example, in the recovery of propylene-trimer, propylene-tetramer, or heptene fractions. Those skilled in the art will perceive that partially-oligomerized product will be returned to the reaction zone via line 16 and line 25 for further reaction with olefin to produce the desired fully oligomerized product in the reaction zone. The benefits which accrue to the cumene process by utilization of the inventive separation process are therefore equally realized when applying the present invention to the synthesis of commercial heptene fractions, propylene-trimer, and propylene-tetramer.

It is to be noted that the fractionation section of the example comprises a depropanizer column and a benzene column. The operating conditions within these fractionation columns are specific for the process set forth in the example, and the operating conditions which may be necessary for any other reactor effluent composition will be readily ascertainable by those skilled in the art. It is not therefore necessary within the description of this invention to discuss broad ranges which are required for such fractionation columns when fractionating a total effluent or a part of the effluent, or for the cumene column which is required in the overall process but which was not shown in the drawing.

It must also be noted, however, that the withdrawal of a vapor sidecut from the depropanizer column to provide a hot recycle benzene stream is new in the art and comprises the heart of the inventive separation process. The location for the withdrawal of this vapor sidecut stream may be varied as the composition of the sidecut will require. It is preferable that the location be such that the sidecut benzene stream will be substantially free of propane and cumene, and that the sidecut should be particularly free of cumene since any cumene which is recycled to the reactor may be dialkylated to produce undesired diisopropylbenzene by-product. It is therefore, desirable that the sidecut vapor stream contain more than 50 mole percent benzene and preferably more than 90 mole percent benzene, while the cumene content is maintained below 5 mole percent and preferably below one mole percent. The exact tray location within the depropanizer column where the vapor composition will meet these ranges or any particularly required composition is readily ascertainable by those skilled in the art of fractionation design in multi-component systems.

The specific operating conditions for the inventive separation process as applied to an oligomerization reactor effluent are readily ascertainable by those skilled in the art by discriminately utilizing the teachings which have been presented hereinabove in reference to the operating conditions which are utilizable and which are preferable in the synthesis of cumene. The tray location for the sidecut recycle of partially-oligomerized product should be established so that the recycle stream contains more than 50 mole percent and preferably more than 90 mole percent of partially oligomerized product, while the content of oligomerized product is maintained at less than 5 mole percent and preferably less than one mole percent in order to minimize the production of heavy polymer by-product.

Preferred embodiment

From the foregoing it may be summarized that a preferred embodiment of the present invention is a process for separation of an aromatic alkylation reaction zone effluent containing propane, benzene, and cumene which comprises: passing at least a part of the effluent from the aromatic alkylation reaction zone to a fractionating column maintained under separation conditions; withdrawing from the fractionating column an overhead fraction comprising propane, a sidecut fraction comprising benzene in high concentration, and a bottoms fraction comprising benzene and cumene; passing the bottoms fraction into a fractionation zone maintained under separation conditions; withdrawing from the fractionation zone a first fraction comprising benzene in high concentration and a second fraction comprising cumene in high concentration; passing the sidecut fraction and at least a part of the first fraction into the reaction zone; and recovering the second fraction.

It is a more particularly preferred embodiment of the present invention, that the process disclosed in the paragraph above is further characterized in that the sidecut fraction and the first fraction contain less than five mole percent cumene.

The invention claimed:
1. Process for separating a reaction zone effluent containing at least three components which comprises:
 (a) passing at least a part of said effluent from a reaction zone into a fractionation column maintained under separation conditions;
 (b) withdrawing from said fractionation column a first fraction comprising a first component, a second fraction comprising a second component, and a third fraction comprising second component and a third component;
 (c) passing said third fraction into a separation zone maintained under separation conditions;
 (d) withdrawing from said separation zone a fourth fraction comprising second component and a fifth fraction comprising said third component in high concentration;

(e) passing said second fraction into said reaction zone; and, (f) recovering said fifth fraction.

2. Process of claim 1 wherein at least a part of said first fraction and at least a part of said fourth fraction are passed into said reaction zone.

3. Process of claim 1 wherein said reaction zone comprises an aromatic alkylation reaction zone, said first component comprises unreactive diluent, said second component comprises alkylatable aromatic compound, and said third component comprises alkylated aromatic compound.

4. Process of claim 3 wherein said first component comprises propane, said second component comprises benzene, and said third component comprises cumene.

5. Process of claim 3 wherin said first component comprises ethane, said second component comprises benzene, and said third component comprises ethylbenzene.

6. Process of claim 1 wherein said reaction zone comprises an oligomerization reaction zone, said first component comprises unreactive diluent, said second component comprises partially-oligomerized product, and said third component comprises oligomerized product.

7. Process of claim 6 wherein said diluent comprises propane and said oligomerized product comprises propylene-trimer.

8. Process of claim 6 wherein said diluent comprises propane and said oligomerized product comprises propylene-tetramer.

9. Process of claim 6 wherein said diluent comprises one of the group consisting of propane, butane, and a propane-butane mixture, and said oligomerized product comprises heptene.

10. Process for separation of an aromatic alkylation reaction zone effluent containing propane, benzene, and cumene which comprises:

(a) passing at least a part of said effluent from the aromatic alkylation reaction zone to a fractionating column maintained under separation conditions;

(b) withdrawing from said fractionating column an overhead fraction comprising propane, a sidecut fraction comprising benzene in high concentration, and a bottoms fraction comprising benzene and cumene;

(c) passing said bottoms fraction into a fractionation zone maintained under separation conditions;

(d) withdrawing from said fractionation zone a first fraction comprising benzene in high concentration and a second fraction comprising cumene in high concentration;

(e) passing said sidecut fraction and at least a part of said first fraction into the reaction zone; and, (f) recovering said second fraction.

References Cited

UNITED STATES PATENTS

| | | | |
|---|---|---|---|
| 3,364,139 | 1/1968 | Kunesh et al. | 208—364 X |
| 3,368,966 | 2/1968 | Borst et al. | 260—683.62 X |
| 3,370,003 | 2/1968 | Borst | 260—683.62 X |
| 3,371,029 | 2/1968 | Weiland | 208—361 X |

DELBERT E. GANTZ, Primary Examiner.

C. R. DAVIS, Assistant Examiner.

U.C. Cl. X.R.

208—355, 364; 260—674, 683.15, 683.62